United States Patent
Gu et al.

(10) Patent No.: US 10,078,762 B1
(45) Date of Patent: Sep. 18, 2018

(54) SYSTEMS AND METHODS FOR DIGITALLY ENFORCING COMPUTER PARENTAL CONTROLS

(71) Applicant: Symantec Corporation, Mountain View, CA (US)

(72) Inventors: Lei Gu, Bedford, MA (US); Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 154 days.

(21) Appl. No.: 15/191,504

(22) Filed: Jun. 23, 2016

(51) Int. Cl.
    *G06F 21/62*     (2013.01)
    *H04L 29/06*     (2006.01)

(52) U.S. Cl.
    CPC ............ *G06F 21/629* (2013.01); *H04L 63/10* (2013.01); *H04L 63/20* (2013.01); *G06F 2221/2149* (2013.01)

(58) Field of Classification Search
    CPC ...................................................... H04L 63/10
    USPC ........................ 726/1, 2, 27, 28, 29
    See application file for complete search history.

(56) References Cited

U.S. PATENT DOCUMENTS

| | | | | |
|---|---|---|---|---|
| 2011/0061109 A1* | 3/2011 | Austin | .................... | H04N 7/163 726/27 |
| 2015/0327052 A1* | 11/2015 | Ghai | ..................... | H04W 48/02 370/328 |

OTHER PUBLICATIONS

Parental Controls; https://en.wikipedia.org/wiki/Parental_controls; as accessed on Jul. 5, 2016.
Norton Family; https://en.wikipedia.org/wiki/Norton_Family; as accessed on Jul. 5, 2016.
Internet of Things; https://en.wikipedia.org/wiki/Internet_of_things; as accessed on Jul. 5, 2016.
Home networking: Everything you need to know; https://www.cnet.com/how-to/home-networking-explained-part-1-heres-the-url-for-you/; as accessed on Jul. 5, 2016.
What is WIFI and how does it work? http://ccm.net/faq/298-what-is-wifi-and-how-does-it-work; as accessed on Jul. 5, 2016.

* cited by examiner

*Primary Examiner* — Izunna Okeke
(74) *Attorney, Agent, or Firm* — FisherBroyles, LLP (57) ABSTRACT

The disclosed computer-implemented method for digitally enforcing computer parental controls may include (i) identifying a parental-control policy that controls a user's computer usage in some way, (ii) determining that the user is using a primary device, which is configured to restrict its usage according to the terms of the parental-control policy, to access a secondary device, which is not configured to restrict its usage according to the terms of the parental-control policy, and (iii) restricting, in response to the determination, the user's access to the secondary device according to the terms of the parental-control policy. Various other methods, systems, and computer-readable media are also disclosed.

20 Claims, 7 Drawing Sheets

SYSTEMS AND METHODS FOR DIGITALLY ENFORCING COMPUTER PARENTAL CONTROLS

BACKGROUND

Parents are faced with an increasingly complicated challenge of managing their children's digital interactions. Existing parental-control software may enforce parental controls (e.g., content restrictions) on a child's dedicated devices (such as the child's phone or iPad) or accounts. However, children often live in homes where they have access to non-dedicated devices, such as smart TVs, smart speakers, etc. In many cases, it may be impractical or infeasible to install parental control software on such devices, leaving children unprotected. As such, the instant disclosure identifies a need for improved systems and methods for applying parental controls to non-dedicated devices that may be accessed by children.

SUMMARY

As will be described in greater detail below, the instant disclosure describes various systems and methods for digitally enforcing computer parental controls. In one example, a computer-implemented method for digitally enforcing computer parental controls may include (i) identifying a parental-control policy that controls a user's computer usage in some way, (ii) determining that the user is using a primary device, which is configured to restrict its usage according to the terms of the parental-control policy, to access a secondary device, which is not configured to restrict its usage according to the terms of the parental-control policy, and (iii) restricting, in response to the determination, the user's access to the secondary device according to the terms of the parental-control policy.

In one embodiment, the primary device and the secondary device may operate within the same network that is managed by the same router. In some examples, determining that the user is using the primary device to access the secondary device may include determining that the primary device is initiating a direct communication with the secondary device via the network. Additionally or alternatively, determining that the user is using the primary device to access the secondary device may include determining that (i) the primary device connects to a cloud-based service at a certain moment in time and (ii) the cloud-based service connects, less than a predetermined amount of time later, to the secondary device. In one embodiment, at least one of the steps of the method may be performed by the router. In some examples, the network may represent an Internet of Things network.

In one embodiment, the primary device may represent a dedicated device configured to be exclusively used by the user and the secondary device may represent a non-dedicated device intended to be used by multiple users including the user. In one example, the primary device may include a mobile device and/or a device that the user is accessing via a user account configured for the user. In an additional or alternative example, the secondary device may include a smart television and/or a smart speaker.

In one embodiment, the parental-control policy may control the user's computer usage by (i) restricting the content that the user may access, (ii) restricting the programs that the user may access, (iii) constraining the times at which the user may use the primary device, and/or (iv) monitoring the user's activity on the primary device.

In one embodiment, a system for implementing the above-described method may include (i) an identification module, stored in memory, that identifies a parental-control policy that controls a user's computer usage in some way, (ii) a determination module, stored in memory, that determines that the user is using a primary device, which is configured to restrict its usage according to the terms of the parental-control policy, to access a secondary device, which is not configured to restrict its usage according to the terms of the parental-control policy, (iii) a restriction module, stored in memory, that restricts, in response to the determination, the user's access to the secondary device according to the terms of the parental-control policy, and (iv) at least one physical processor configured to execute the identification module, the determination module, and the restriction module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a parental-control policy that controls a user's computer usage in some way, (ii) determine that the user is using a primary device, which is configured to restrict its usage according to the terms of the parental-control policy, to access a secondary device, which is not configured to restrict its usage according to the terms of the parental-control policy, and (iii) restrict, in response to the determination, the user's access to the secondary device according to the terms of the parental-control policy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for digitally enforcing computer parental controls. As will be explained in greater detail below, the disclosed systems and methods may facilitate enforcing parental-control policies across all devices within a network. In some examples, the disclosed systems and methods may (i) detect network traffic between a user's primary device (e.g., a phone or laptop) and a secondary device (e.g., a family television), (ii) infer that the user associated with the primary device is controlling the secondary device, and (iii) enforce a parental-control policy assigned to the user on the secondary device. In some examples these steps may be performed by a router (e.g., a home router in an Internet of Things network). By inferring that a user of a primary device is accessing a secondary device based on network traffic between the primary device and the secondary device, the disclosed systems and methods may facilitate enforcing parental-control policies on devices on which it may be difficult or infeasible to install parental-control software.

The following will provide, with reference to FIGS. 1-2 and 4-5, detailed descriptions of exemplary systems for digitally enforcing computer parental controls. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

Figure 1:
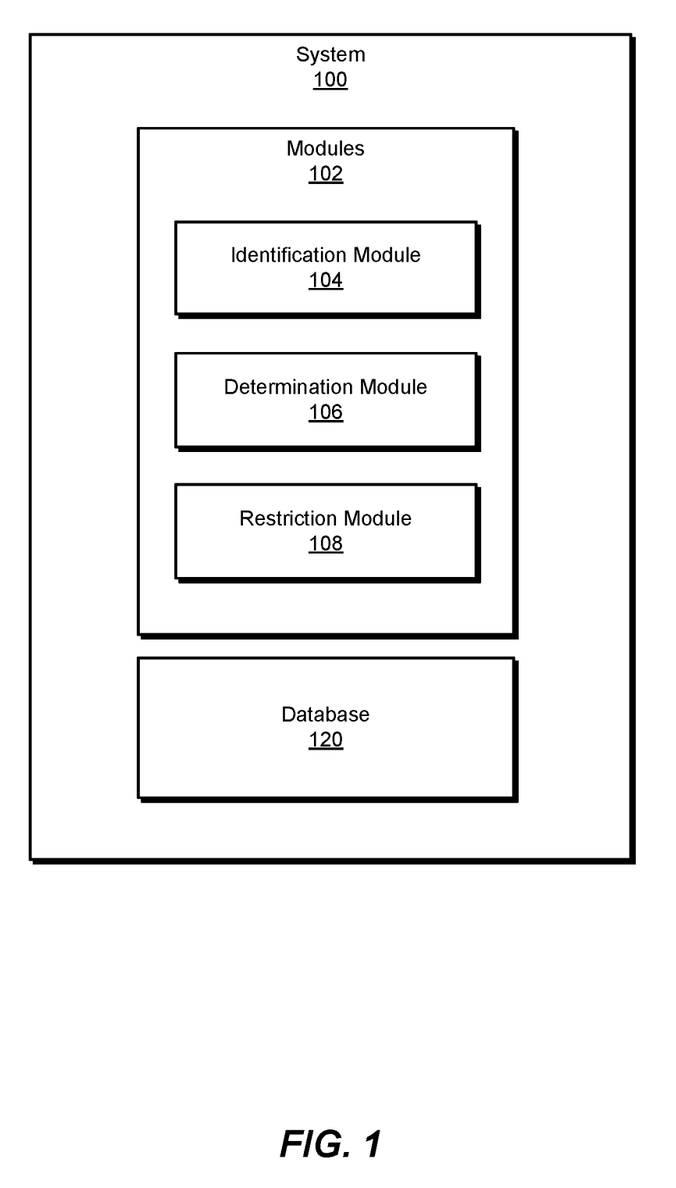
FIG. 1 is a block diagram of an exemplary system for digitally enforcing computer parental controls.

FIG. 1 is a block diagram of exemplary system 100 for digitally enforcing computer parental controls. As illustrated in this figure, exemplary system 100 may include one or more modules 102 for performing one or more tasks. For example, and as will be explained in greater detail below, exemplary system 100 may include an identification module 104 that identifies a parental-control policy that controls a user's computer usage in some way. Exemplary system 100 may additionally include a determination module 106 that determines that the user is using a primary device, which is configured to restrict its usage according to the terms of the parental-control policy, to access a secondary device, which is not configured to restrict its usage according to the terms of the parental-control policy. Exemplary system 100 may also include a restriction module 108 that restricts, in response to the determination, the user's access to the secondary device according to the terms of the parental-control policy. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., router 202, primary device 206, and/or secondary device 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a parental-control policy 210. Database 120 may represent portions of a single database or computing device or a plurality of databases or computing devices. For example, database 120 may represent a portion of a device depicted in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as a device in FIG. 2, computing system 610 in FIG. 6, and/or portions of exemplary network architecture 700 in FIG. 7.

Figure 2:
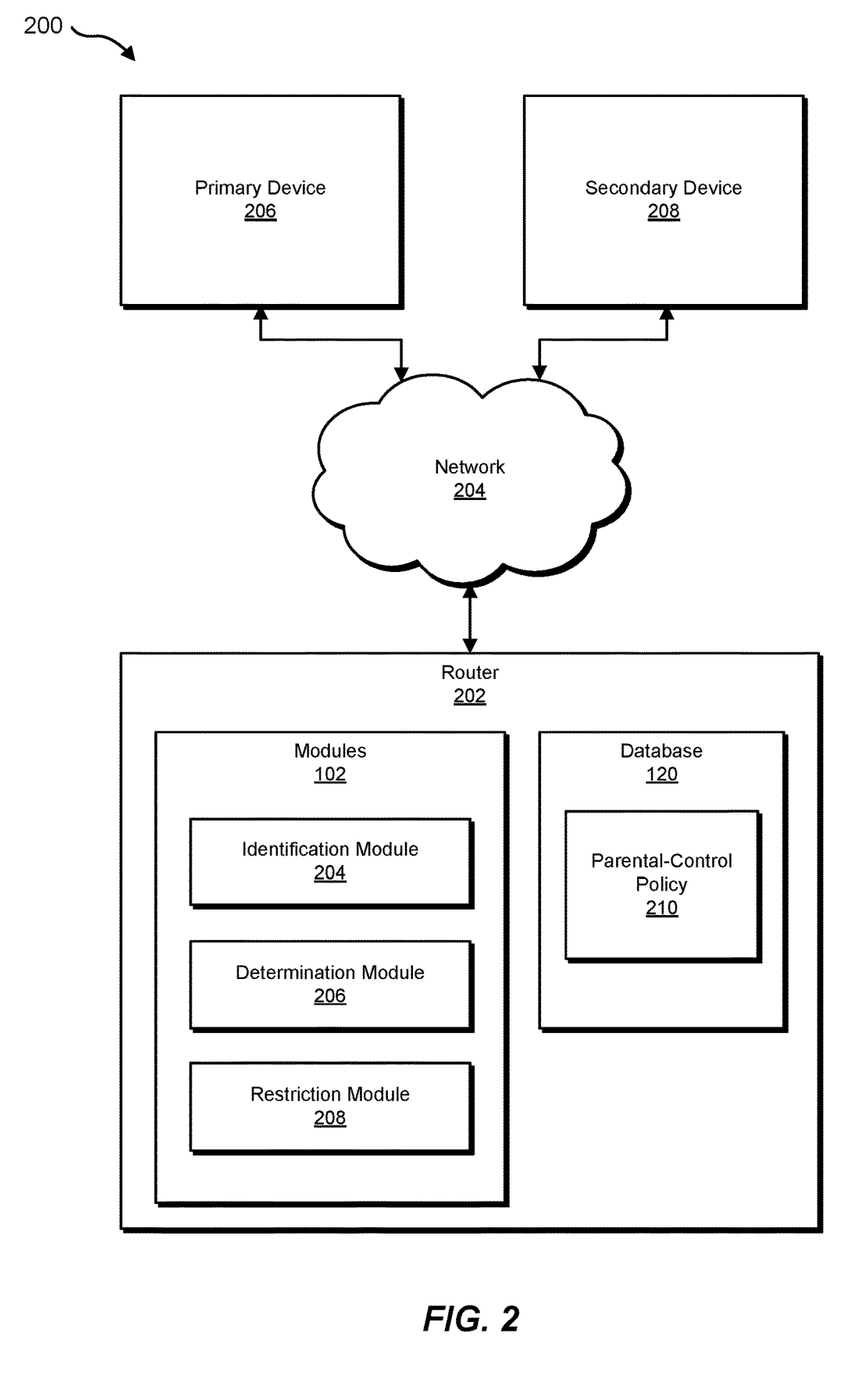
FIG. 2 is a block diagram of an additional exemplary system for digitally enforcing computer parental controls.

Exemplary system 100 in FIG. 1 may be implemented in a variety of ways. For example, all or a portion of exemplary system 100 may represent portions of exemplary system 200 in FIG. 2. As shown in FIG. 2, system 200 may include a router 202 that facilitates data transfer between a primary device 206 and a secondary device 208 within a network 204. In one example, router 202 may be programmed with one or more of modules 102 and/or may store all or a portion of the data in database 120. Additionally or alternatively, primary device 206 and/or secondary device 208 may be programmed with one or more of modules 102 and/or may store all or a portion of the data in database 120.

In one embodiment, one or more of modules 102 from FIG. 1 may, when executed by router 202, primary device 206, and/or secondary device 208, enable router 202, primary device 206, and/or secondary device 208 to digitally enforce computer parental-controls. For example, and as will be described in greater detail below, identification module 104 may identify a parental-control policy 210 that controls a user's computer usage in some way. Determination module 106 may then determine that the user is using a primary device 206, which is configured to restrict its usage according to the terms of parental-control policy 210, to access a secondary device 208, which is not configured to restrict its usage according to the terms of parental-control policy 210. In response to this determination, restriction module 108 may restrict the user's access to secondary device 208 according to the terms of parental-control policy 210.

Router 202 generally represents any type or form of networking device that performs traffic directing functions within a network. In some examples, router 202 may include one or more Local Area Network (LAN) ports. In these examples, devices (such as primary device 206 and secondary device 208) may connect to router 202 via a network cable that plugs into one of the local area network ports. Additionally or alternatively, router 202 (and devices connecting to router 202) may include one or more antennas. In these examples, router 202 may broadcast a wireless radio signal, such as a Wireless Fidelity (Wi-Fi) signal, to which the devices may connect in order to communicate with one another via router 202. In one example, router 202 may also include a Wide Area Network (WAN) port that connects to an Internet source (e.g., a modem) such that devices connected to router 202 (e.g., via a wired and/or wireless connection) may access the Internet. In other examples, router 202 may include a built-in Internet source.

In some examples, router 202 may represent a home router that performs traffic direction functions within an Internet of Things (IoT) network. As used herein, the term "Internet of Things" generally refers to any type or form of network of devices or other items in which data is collected and/or exchanged. In some examples, router 202 may manage network traffic for devices connected to network 204.

Primary device 206 and secondary device 208 generally represent any type or form of computing device capable of reading computer-executable instructions. Examples of primary device 206 and secondary device 208 include, without limitation, laptops, tablets, desktops, servers, cellular phones, televisions, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device. In some examples, primary device 206 and/or secondary device 208 may include a wireless transmitter that (i) translates data from primary device 206 and/or secondary device 208 into a radio signal and (ii) transmits the radio signal to router 202.

In one embodiment, primary device 206 may represent a dedicated device configured to be exclusively used by the user, such as a mobile device, a laptop, and/or a tablet. In another embodiment, primary device 206 may represent a device that the user accesses via a user account configured specifically for the user. In some examples, secondary device 208 may represent a non-dedicated device intended to be used by multiple users including the user, such as a family television. In one example, secondary device 208 may represent a device that does not require a log-in process to be used. Additionally or alternatively, secondary device 208 may represent a device on which it may be difficult and/or impossible to install parental-control software.

In some examples, secondary device 208 may represent an IoT device. Examples of an IoT device may include, without limitation, a smart television, a Wi-Fi-enabled speaker (such as a SONOS speaker), a digital media player (such as a CHROMECAST), a tablet (such as a KINDLE FIRE), a television stick (such as a ROKU), a video game console, and/or a device installed with streaming applications (such as YOUTUBE and/or NETFLIX). In some examples, primary device 206 and secondary device 208 may belong to a network (e.g., an IoT network) that is managed by a home router, such as router 202.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between primary device 206 and secondary device 208.

Figure 3:
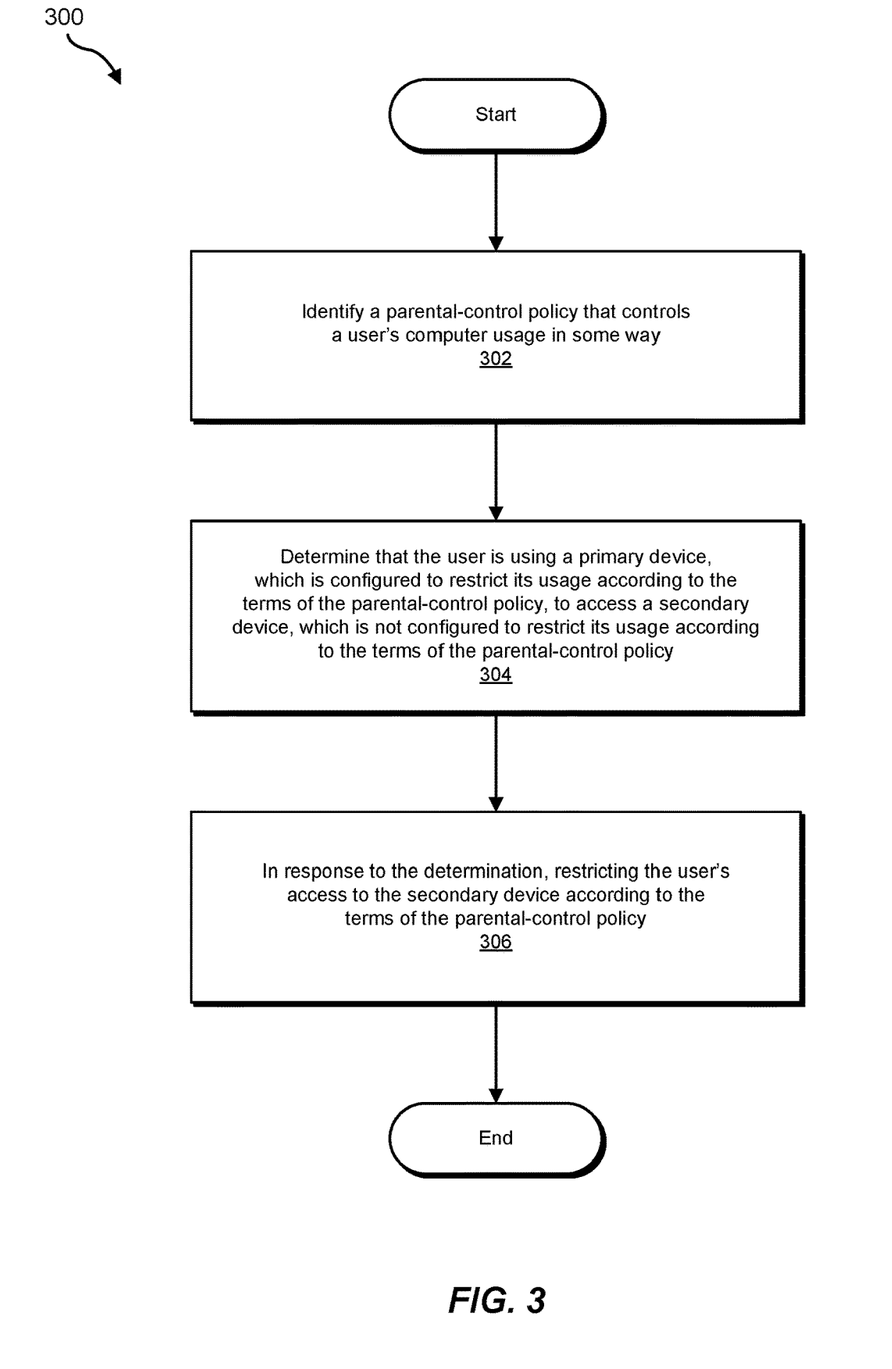
FIG. 3 is a flow diagram of an exemplary method for digitally enforcing computer parental controls.

FIG. 3 is a flow diagram of an exemplary computer-implemented method 300 for digitally enforcing computer parental controls. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify a parental-control policy that controls a user's computer usage in some way. For example, identification module 104 may, as part of router 202 in FIG. 2, identify a parental-control policy 210 that controls the computer usage of a user of primary device 206.

As used herein, the term "parental-control policy" generally refers to any type or form of instruction for controlling the computing device access of a user (e.g., a child). Parental-control policy 210 may control the user's access in a variety of ways. In some examples, parental-control policy 210 may restrict the content that the user may access. For example, parental-control policy 210 may limit the user to only accessing certain pre-authorized webpages and/or prevent the user from accessing certain prohibited webpages. Similarly, parental-control policy 210 may restrict the programs that the user may access.

In one embodiment, parental-control policy 210 may constrain the times at which the user may use the primary device. For example, parental-control policy 210 may limit the amount of screen time permitted in a day and/or restrict the times during which the user may access primary device 206. In one such example, parental-control policy 210 may include a curfew after which the user may not access primary device 206. In some examples, parental-control policy 210 may include an instruction to monitor the user's activity on primary device 206. In these examples, parental-control policy 210 may also include an instruction to send a result of the monitoring to the user's guardian.

In some examples, router 202 may be configured with parental-control policy 210. Additionally or alternatively, primary device 206 may have installed parental-control software that includes the terms of parental-control policy 210.

At step 304, one or more of the systems described herein may determine that the user is using a primary device, which is configured to restrict its usage according to the terms of the parental-control policy, to access a secondary device, which is not configured to restrict its usage according to the terms of the parental-control policy. For example, determination module 106 may, as part of router 202 in FIG. 2, determine that the user is using primary device 206, which is configured to restrict its usage according to the terms of parental-control policy 210, to access secondary device 208, which is not configured to restrict its usage according to the terms of parental-control policy 210.

Determination module 106 may determine that the user is using primary device 206 to access secondary device 208 in a variety of ways. In some embodiments, determination module 106 may (i) determine that the user is associated with primary device 206, (ii) identify a communication (either a direct communication or an indirect communication) between primary device 206 and secondary device 208, and (iii) infer (e.g., based on determining that the user is associated with primary device 206 and that primary device 206 is communicating with secondary device 208) that the user is using primary device 206 to access secondary device 208.

Determination module 106 may determine that the user (i.e., the user to whom parental-control policy 210 applies) is associated with primary device 206 in a variety of ways. In some examples, primary device 206 may be associated with the user in parental-control policy 210. In these examples, determination module 106 may receive this information from parental-control policy 210. Additionally or alternatively, router 202 may include a router credential that associates primary device 206 with the user. In these examples, determination module 106 may receive this information from router 202. Additionally or alternatively, parental-control software installed on primary device 206 may associate the user with primary device 206. In these examples, determination module 106 may receive this information from the parental-control software.

Determination module 106 may identify various types of associations between the user and primary device 206. In some examples, the user may represent the primary user of primary device 206. For example, primary device 206 may represent a mobile phone, laptop, and/or tablet that is primarily used by the user. Additionally or alternatively, primary device 206 may include a user account that corresponds to the user.

Determination module 106 may identify communications between primary device 206 and secondary device 208 in several ways. In some examples, primary device 206 may initiate a direct communication with secondary device 208 via a local network. For example, as shown in exemplary system 400 illustrated in FIG. 4, primary device 206 may transmit data (i.e., data intended for secondary device 208) to router 202 over a local area network 402 and router 202 may then transmit the data, over local area network 402, to secondary device 208.

Figure 4:
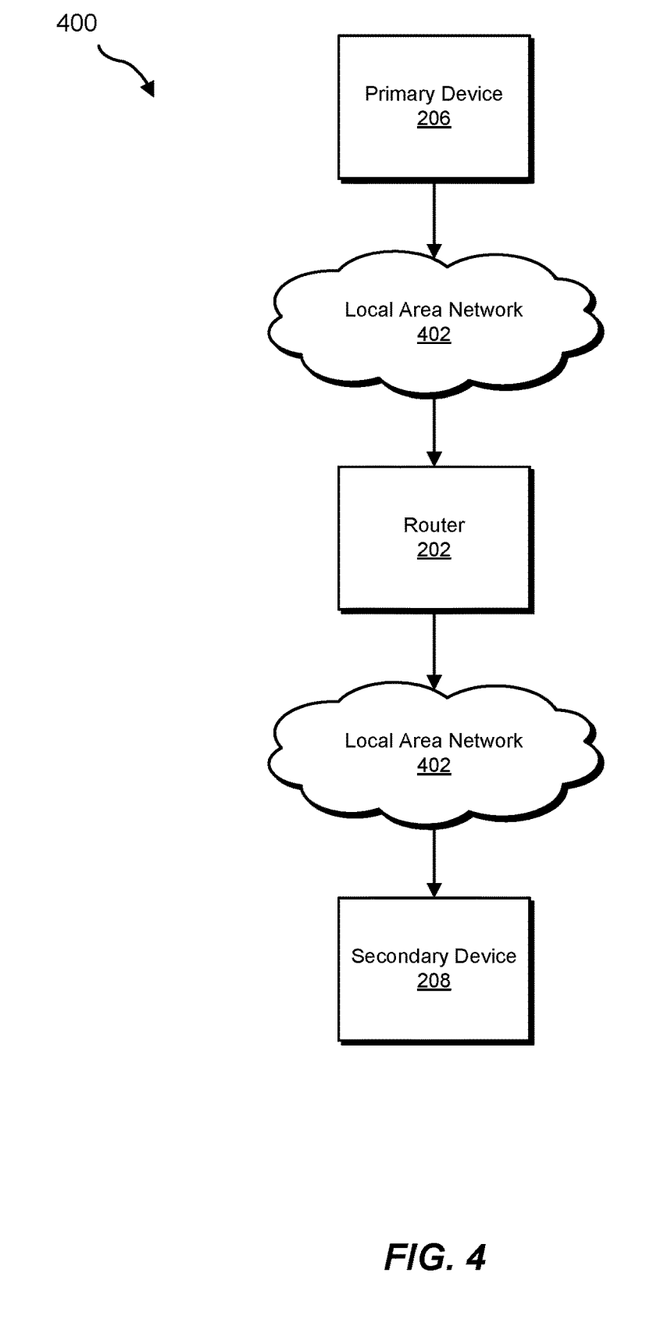
FIG. 4 is a block diagram of an additional exemplary system for digitally enforcing computer parental controls.

To give a specific example, primary device 206 may represent a child's mobile device and secondary device 208 may represent an IoT speaker. In this example, the child may be attempting to play music (e.g., music downloaded on his or her mobile phone) on the IoT speaker by making a selection on the mobile phone. In response to receiving the user's selection, the mobile phone may transmit an instruction to play the music (i.e., an instruction intended for secondary device 208) to router 202 such that router 202 may transmit the instruction to secondary device 208.

In additional or alternative examples, primary device 206 may be initiating an indirect communication with secondary device 208. For example, as shown in exemplary system 500 illustrated in FIG. 5, primary device 206 may transmit data (i.e., data intended to provoke an action in secondary device 208) to router 202 over a local area network 502 and router 202 may then transmit that data over a wide area network 504 to a server 506 of a cloud-based service that services secondary device 208. Server 506 may then transmit this data (i.e., the data intended for secondary device 208) to router 202 and router 202 may route the data to secondary device 208.

Figure 5:
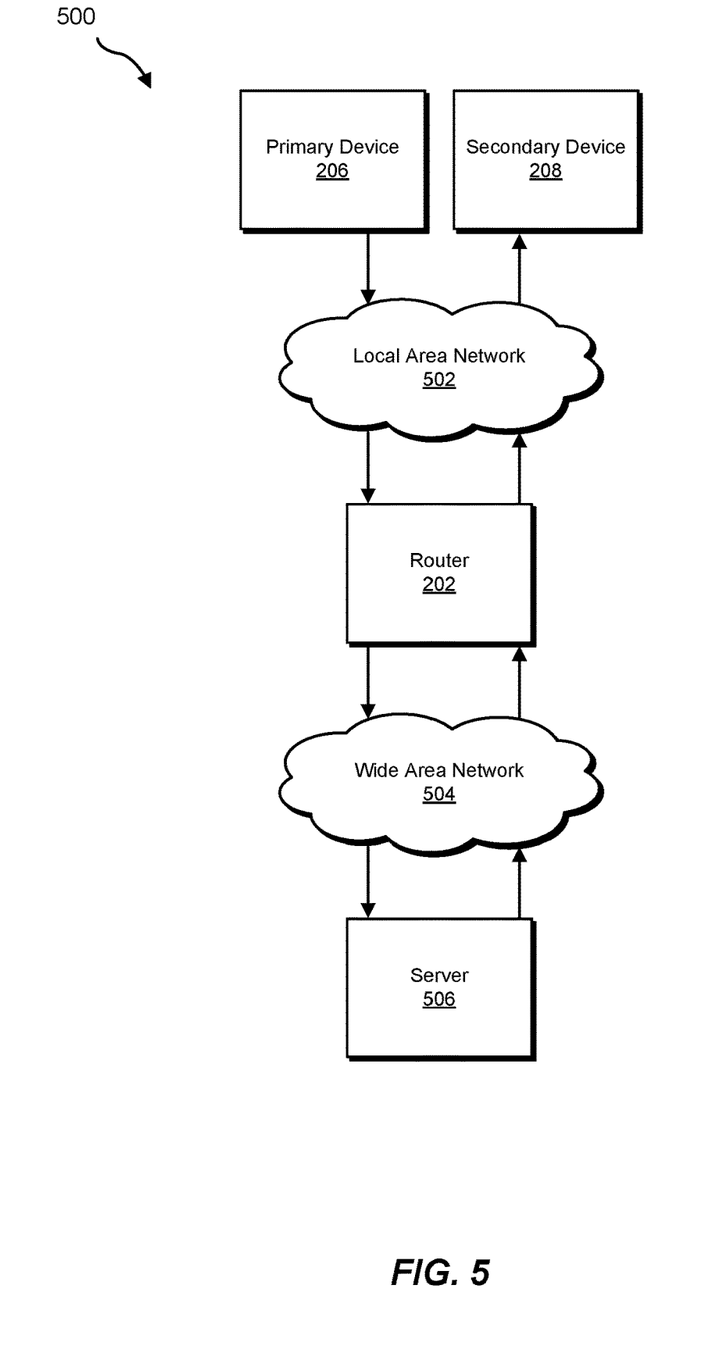
FIG. 5 is a block diagram of an additional exemplary computing system for digitally enforcing computer parental controls.

To give a specific example, a child may be attempting to watch a NETFLIX video on a family television, using his personal mobile phone to make a selection. In response to receiving a NETFLIX selection from the user, the mobile phone may transmit an instruction to play the video to router 202 such that router 202 may transmit the instruction to a server managed by NETFLIX. Thereafter, the NETFLIX server may send data (e.g., data relating to the requested video and/or a requested search) to router 202 such that router 202 may transmit the data received from NETFLIX to secondary device 208.

In examples in which primary device 206 is initiating a communication (e.g., a direct communication or an indirect communication) with secondary device 208, determination module 106 may determine that primary device 206 is communicating with secondary device 208 based on network traffic that identifies the communication. In some examples, determination module 106 may operate as part of router 202. In this example, determination module 106 may determine that primary device 206 is initiating the communication with secondary device 208 by collecting the traffic information directly. In other examples, determination module 106 may operate as part of a backend server that receives traffic information from router 202. In this example, determination module 106 may determine that primary device 206 is initiating the communication based on traffic information received from router 202.

In examples in which primary device 206 is initiating an indirect communication with secondary device 208, determination module 106 may determine that primary device 206 is communicating with secondary device 208 if (i) primary device 206 connects to a server at a certain moment in time and (ii) the server connects to secondary device 208 less than a predetermined amount of time later. For example, in the specific example described above, determination module 106 may determine that the child's mobile phone is connecting to the family television based on determining that (i) the mobile device connected to a NETFLIX server at a certain moment in time and (ii) the NETFLIX server connected, less than a predetermined amount of time later, to the family television.

Returning to FIG. 3, at step 306, one or more of the systems described herein may restrict, in response to the determination, the user's access to the secondary device according to the terms of the parental-control policy. For example, restriction module 108 may, in response to the determination and as part of router 202 in FIG. 2, restrict the user's access to secondary device 208 according to the terms of parental-control policy 210.

Restriction module 108 may restrict the user's access to secondary device 208 in a variety of ways. In some examples, restriction module 108 may restrict the user's access according to the terms of parental-control policy 210. For example, in examples in which parental-control policy 210 restricts the content that the user may access, restriction module 108 may restrict the content that may be accessed from secondary device 208. To give a specific example, parental-control policy 210 may limit the user to only watching films with a "G" rating. In this example, restriction module 108 may restrict secondary device 208 to only displaying films with a "G" rating.

Similarly, in examples in which parental-control policy 210 limits the webpages and/or programs that the user may access, restriction module 108 may limit the webpages and/or programs that may be accessed from secondary device 208. To give a specific example, parental-control policy 210 may indicate that the user may only access a certain set of webpages that are deemed appropriate for children. In this example, restriction module 108 may restrict secondary device 208 to only allowing the user to access the certain set of webpages designated in parental-control policy 210.

In examples in which parental-control policy 210 constrains the times at which the user may use primary device 206, restriction module 108 may constrain the times at which the user uses secondary device 208. To give a specific example, parental-control policy 210 may specify a certain curfew time, after which screen time is prohibited for the user. In this example, restriction module 108 may initiate an action that enforces the curfew time. In examples in which parental-control policy 210 includes an instruction to monitor the user's activity on primary device 206, restriction module 108 may initiate an action to monitor the content accessed on secondary device 208 (e.g., by logging content streamed to secondary device 208 according to the terms of parental-control policy 210).

Restriction module 108 may enforce the restrictions included within parental-control policy 210 in various ways. In some examples, restriction module 108 may enforce a restriction by logging and reporting activities initiated by primary device 206 to a guardian's device. Additionally or alternatively, restriction module 108 may send the child a push notification message that indicates that the child's access is being restricted and/or provides a reason for the restriction (e.g., an explanation that it is past the child's curfew). In some examples, restriction module 108 may block the network activity altogether (e.g., by not routing data from primary device 206 to secondary device 208 and/or by not routing data from the Internet to secondary device 208 that was determined to be requested via primary device 206).

In some examples, restriction module 108 may limit the usage of secondary device 208 for a set amount of time (e.g., half an hour) following the determination described in step 304. In other examples, the limit may be event-based (e.g., each action initiated from primary device 206 may be limited). In some examples, restriction module 108 may only restrict the usage of secondary device 208 if determination module 106 determines that secondary device 208 is being accessed by primary device 206. In these examples, restriction module 108 may not enforce parental-control policy 210 if the router detects traffic from a device other than primary device 206 (e.g., if the router detects traffic from a parent's mobile device).

As described above, the disclosed systems and methods may enable using a home router to (i) detect network traffic between a dedicated device and a non-dedicated device (e.g., an Internet of Things device), (ii) infer who is controlling the dedicated device, and (iii) apply a parental-control policy associated with the inferred controlling person to the non-dedicated device (e.g., by logging or blocking content streamed to the non-dedicated device according to terms of the parental control policy). The owner of the dedicated device may be identified in various ways. For example, the owner may be identified through configuration, by router credential, or via parental-control software.

In some examples, the dedicated device may represent a mobile device and the non-dedicated device may represent an IoT device that may be controlled from an application running on the mobile device. In these examples, the home router may detect local wireless network traffic from the mobile device to the IoT device. Based on this traffic, the router may infer that the user of the mobile device is also the current user of the IoT device. If the router determines that the user of the mobile device is a user (e.g., a child) who is subject to the terms of a parental-control policy, the home router may ensure that the policy is applied to the IoT device. In additional or alternative examples, the home router may (i) detect network traffic between the dedicated device and a cloud-based service, (ii) a short time later, detect network traffic between the cloud-based service and the non-dedicated device, (iii) infer that the user of the mobile device is controlling the non-dedicated device, and (iv) apply the parental-control policy associated with the user to the non-dedicated device.

Figure 6:
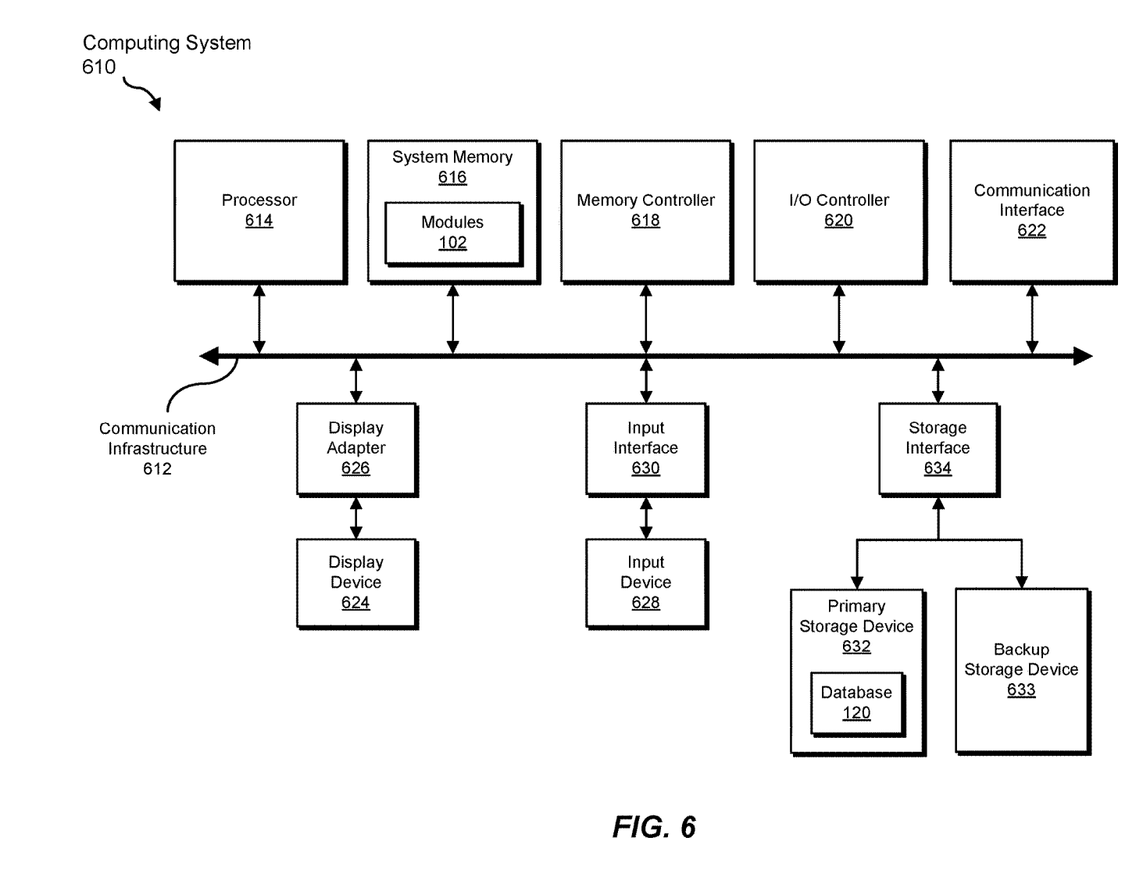
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
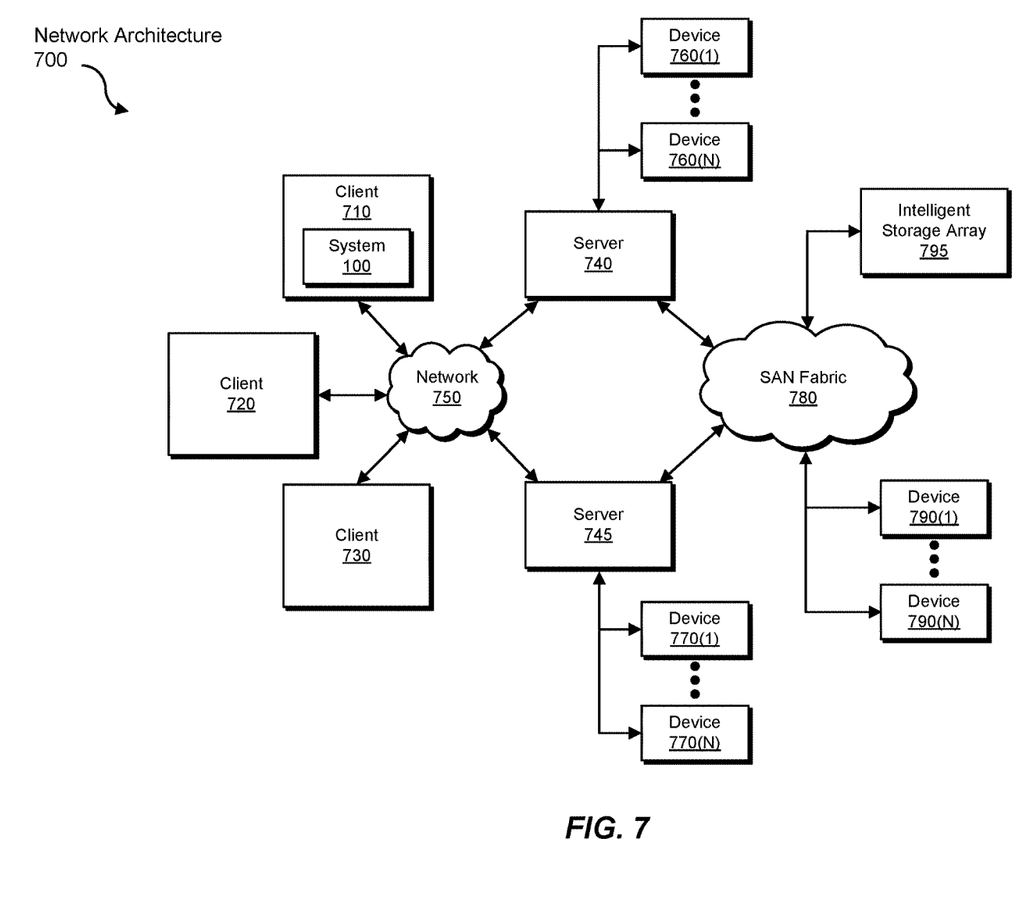
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for digitally enforcing computer parental controls.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request from a dedicated device to access data from a non-dedicated device and use the request to initiate enforcing a policy. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for digitally enforcing computer parental controls, at least a portion of the method being performed by a computing device comprising at least one processor, the method comprising:
   identifying a shared device that may be accessed and controlled by a plurality of personal devices, wherein:
      the plurality of personal devices and the shared device operate within a same network that is managed by a same router;
      the plurality of personal devices includes a restricted user's personal device and a non-restricted user's personal device;
      the restricted user's personal device is controlled by a parental-control policy assigned to the restricted user that comprises one or more restrictions to the restricted user's computer usage; and
      the non-restricted user's personal device is not controlled by the parental-control policy assigned to the restricted user;
   at a first moment in time:
      determining that that the restricted user's device is accessing the shared device by initiating at least one of a direct communication and an indirect communication with the shared device via the network, wherein:
  determining that the restricted user's device has initiated the direct communication comprises determining that the restricted user's device has transmitted data intended for the shared device to the router over the network; and
  determining that the restricted user's device has initiated the indirect communication comprises determining that the restricted user's device has connected to a cloud-based service at a certain moment in time and that the cloud-based service has connected, less than a predetermined amount of time later, to the shared device; and
restricting access to the shared device via the restricted user's personal device according to the terms of the parental-control policy assigned to the restricted user, based on the determination that the restricted user's device is accessing the shared device; and
at a second moment in time:
  determining that the non-restricted user's device is accessing the shared device by initiating at least one of a direct communication and an indirect communication with the shared device via the network, wherein:
    determining that the non-restricted user's device has initiated the direct communication comprises determining that the non-restricted user's device has transmitted data intended for the shared device to the router over the network; and
    determining that the non-restricted user's device has initiated the indirect communication comprises determining that the non-restricted user's device has connected to a cloud-based service at a certain moment in time and that the cloud-based service has connected, less than a predetermined amount of time later, to the shared device; and
  not restricting access to the shared device via the non-restricted user's personal device according to the terms of the parental-control policy.

2. The computer-implemented method of claim 1, wherein the restricted user's personal device comprises a mobile device.

3. The computer-implemented method of claim 2, wherein:
  the shared device comprises a smart speaker; and
  determining that the restricted user's device is accessing the shared device comprises determining that the restricted user's mobile device is transmitting an instruction to the smart speaker to play music that has been downloaded to the restricted user's mobile device.

4. The computer-implemented method of claim 2, wherein:
  the shared device comprises a smart television; and
  determining that the restricted user's device is accessing the shared device comprises determining that the restricted user's mobile device is transmitting an instruction to the smart television to stream a video selected via the restricted user's mobile device.

5. The computer-implemented method of claim 2, wherein at least one of the steps of the method is performed by the router.

6. The computer-implemented method of claim 1, wherein the network comprises an Internet of Things network.

7. The computer-implemented method of claim 1, wherein:
  the restricted user's personal device represents a dedicated device configured to be exclusively used by the restricted user; and
  the shared device represents a non-dedicated device intended to be used by multiple users including the restricted user.

8. The computer-implemented method of claim 1, wherein the restricted user's personal device comprises a device that the restricted user is accessing via a user account configured for the restricted user.

9. The computer-implemented method of claim 1, wherein the shared device comprises at least one of:
  a digital media player;
  a tablet;
  a video game console; and
  a device installed with streaming applications.

10. The computer-implemented method of claim 1, wherein the parental-control policy restricts the restricted user's computer usage by at least one of:
  restricting the content that the restricted user may access;
  restricting the programs that the restricted user may access;
  constraining the times at which the restricted user may use the restricted user's personal device; and
  monitoring the restricted user's activity on the restricted user's personal device.

11. A system for digitally enforcing computer parental controls, the system comprising:
  an identification module, stored in memory, that identifies a shared device that may be accessed and controlled by a plurality of personal devices, wherein:
    the plurality of personal devices and the shared device operate within a same network that is managed by a same router;
    the plurality of personal devices includes a restricted user's personal device and a non-restricted user's personal device;
    the restricted user's personal device is controlled by a parental-control policy assigned to the restricted user that comprises one or more restrictions to the restricted user's computer usage; and
    the non-restricted user's personal device is not controlled by the parental-control policy assigned to the restricted user;
  a determination module and a restriction module, stored in memory, that:
    at a first moment in time:
      determine that that the restricted user's device is accessing the shared device by initiating at least one of a direct communication and an indirect communication with the shared device via the network, wherein:
        determining that the restricted user's device has initiated the direct communication comprises determining that the restricted user's device has transmitted data intended for the shared device to the router over the network; and
        determining that the restricted user's device has initiated the indirect communication comprises determining that the restricted user's device has connected to a cloud-based service at a certain moment in time and that the cloud-based service has connected, less than a predetermined amount of time later, to the shared device; and restrict access to the shared device via the first user's personal device according to the terms of the parental-control policy assigned to the restricted user, based on the determination that the restricted user's device is accessing the shared device; and at a second moment in time:
  determine that that the non-restricted user's device is accessing the shared device by initiating at least one of a direct communication and an indirect communication with the shared device via the network, wherein:
    determining that the non-restricted user's device has initiated the direct communication comprises determining that the non-restricted user's device has transmitted data intended for the shared device to the router over the network; and
    determining that the non-restricted user's device has initiated the indirect communication comprises determining that the non-restricted user's device has connected to a cloud-based service at a certain moment in time and that the cloud-based service has connected, less than a predetermined amount of time later, to the shared device; and
  not restrict access to the shared device via the non-restricted user's personal device according to the terms of the parental-control policy; and at least one physical processor configured to execute the identification module, the determination module, and the restriction module.

12. The system of claim 11, wherein the restricted user's personal device comprises a mobile device.

13. The system of claim 12, wherein:
the shared device comprises a smart speaker; and
the determination module determines that the restricted user's device is accessing the shared device by determining that the restricted user's mobile device is transmitting an instruction to the smart speaker to play music that has been downloaded to the restricted user's mobile device.

14. The system of claim 12, wherein:
the shared device comprises a smart television; and
the determination module determines that the restricted user's personal device is attempting to access the shared device by determining that the restricted user's mobile device is transmitting an instruction to the smart television to stream a video selected via the restricted user's mobile device.

15. The system of claim 12, wherein at least one of the modules of the system operates within the router.

16. The system of claim 12, wherein the network comprises an Internet of Things network.

17. The system of claim 11, wherein:
the restricted user's personal device represents a dedicated device configured to be exclusively used by the restricted user; and
the shared device represents a non-dedicated device intended to be used by multiple users including the restricted user.

18. The system of claim 11, wherein the restricted user's personal device comprises a device that the restricted user is accessing via a user account configured for the restricted user.

19. The system of claim 11, wherein the shared device comprises at least one of:

a digital media player;
a tablet;
a video game console; and
a device installed with streaming applications.

20. A non-transitory computer-readable medium comprising one or more computer-readable instructions that, when executed by at least one processor of a computing device, cause the computing device to:

identify a shared device that may be accessed and controlled by a plurality of personal devices, wherein:
  the plurality of personal devices and the shared device operate within a same network that is managed by a same router;
  the plurality of personal devices includes a restricted user's personal device and a non-restricted user's personal device;
  the restricted user's personal device is controlled by a parental-control policy assigned to the restricted user that comprises one or more restrictions to the restricted user's computer usage; and
  the non-restricted user's personal device is not controlled by the parental-control policy assigned to the restricted user;

at a first moment in time:
  determine that the restricted user's device is accessing the shared device by initiating at least one of a direct communication and an indirect communication with the shared device via the network, wherein:
    determining that the restricted user's device has initiated the direct communication comprises determining that the restricted user's device has transmitted data intended for the shared device to the router over the network; and
    determining that the restricted user's device has initiated the indirect communication comprises determining that the restricted user's device has connected to a cloud-based service at a certain moment in time and that the cloud-based service has connected, less than a predetermined amount of time later, to the shared device; and
  restrict access to the shared device via the restricted user's personal device, according to the terms of the parental-control policy assigned to the restricted user, based on the determination that the restricted user's device is accessing the shared device; and at a second moment in time:
  determine that that the non-restricted user's device is accessing the shared device by initiating at least one of a direct communication and an indirect communication with the shared device via the network, wherein:
    determining that the non-restricted user's device has initiated the direct communication comprises determining that the non-restricted user's device has transmitted data intended for the shared device to the router over the network; and
    determining that the non-restricted user's device has initiated the indirect communication comprises determining that the non-restricted user's device has connected to a cloud-based service at a certain moment in time and that the cloud-based service has connected, less than a predetermined amount of time later, to the shared device; and
  not restrict access to the shared device via the non-restricted user's personal device according to the terms of the parental-control policy.

* * * * *